United States Patent
Ahlèn

(10) Patent No.: US 9,120,633 B2
(45) Date of Patent: Sep. 1, 2015

(54) GRAIN SWEEP CONVEYOR

(71) Applicant: Skandia Elevator AB, Vara (SE)

(72) Inventor: Anders Ahlèn, Vara (SE)

(73) Assignee: Skandia Elevator AB, Vara (SE)

( * ) Notice: Subject to any disclaimer, the term of this patent is extended or adjusted under 35 U.S.C. 154(b) by 189 days.

(21) Appl. No.: 13/673,901

(22) Filed: Nov. 9, 2012

(65) Prior Publication Data

US 2013/0121794 A1 May 16, 2013

(30) Foreign Application Priority Data

Nov. 11, 2011 (SE) .................................. 1151071-6

(51) Int. Cl.
*B65G 65/42* (2006.01)
*B65G 23/00* (2006.01)
*B65G 69/08* (2006.01)
*B65G 65/46* (2006.01)

(52) U.S. Cl.
CPC .............. *B65G 65/425* (2013.01); *B65G 23/00* (2013.01); *B65G 65/42* (2013.01); *B65G 65/46* (2013.01); *B65G 69/08* (2013.01)

(58) Field of Classification Search
CPC ................... B65G 65/00–65/48; B65G 65/425
USPC ........................................................ 414/306
See application file for complete search history.

(56) References Cited

U.S. PATENT DOCUMENTS

| | | | |
|---|---|---|---|
| 1,969,367 A | | 8/1934 | Guthrie |
| 2,944,686 A * | | 7/1960 | Church, Jr. .................... 414/306 |
| 2,948,422 A * | | 8/1960 | Hilderbrand ................... 414/306 |
| 3,456,818 A * | | 7/1969 | Massey ........................... 414/302 |
| 4,616,969 A * | | 10/1986 | Haahjem ..................... 414/142.4 |
| 5,333,762 A * | | 8/1994 | Andrews ......................... 222/238 |
| 5,769,590 A * | | 6/1998 | Weikel ........................... 414/321 |
| 6,499,930 B1 | | 12/2002 | Dixon |
| 7,588,405 B2 * | | 9/2009 | Johnson et al. ................ 414/327 |
| 8,167,525 B2 * | | 5/2012 | Hlinka ........................... 414/305 |
| 8,770,388 B1 * | | 7/2014 | Chaon et al. ................... 198/728 |
| 2006/0269383 A1 | | 11/2006 | Lepp et al. |
| 2007/0015556 A1 | | 1/2007 | Johnson et al. |
| 2010/0186736 A1 * | | 7/2010 | Burke et al. ....................... 127/1 |

OTHER PUBLICATIONS

Extended European Search Report received for European Patent Application No. 12192057.3, mailed on Feb. 8, 2013, 5 pages.

* cited by examiner

*Primary Examiner* — Saul Rodriguez
*Assistant Examiner* — Ashley Romano
(74) *Attorney, Agent, or Firm* — Morrison & Foerster LLP

(57) ABSTRACT

A grain sweep (1) for use on a floor comprises an elongated frame, said frame comprises an elongated hood (2) comprising a top panel (3) and first (4) and second (5) side walls. It further comprises a first (6) and a second wheel rotatably attached to said elongated frame adjacent a first and a second end of said elongated frame, respectively, a drive means (7) passing about said first (6) and second wheels, and a plurality of spaced apart paddles (8) arranged on said drive means (7). The hood (2) further comprises one bottom wall (9) extending from one of said side walls. At least one paddle (10) comprises a side with one part (11) adjacent the bottom wall and parallel with the floor and one part (12) with corresponding shape to the bottom wall (9).

10 Claims, 4 Drawing Sheets

GRAIN SWEEP CONVEYOR

CROSS-REFERENCE TO RELATED APPLICATION

This application claims priority to Swedish Patent Application No. 1151071-6, filed Nov. 11, 2011, which is hereby incorporated by reference in the present disclosure in its entirety.

BACKGROUND

1. Field

The present invention relates to a grain sweep for use on a floor comprising an elongated frame, said frame comprising an elongated hood comprising a top panel and first and second side walls, a first and a second wheel rotatably attached to said elongated frame adjacent a first and a second end of said elongated frame, respectively, a drive means passing about said first and second wheels, and a plurality of spaced apart paddles arranged on said drive means.

2. Description of the Related Art

For moving bulk granules substances such as for instance wheat, oats, rye, barley, shelled or ground corn, conveyors are generally used. Storage means for such substances could for example be a silo or a storage bin. When storage means are emptied, first gravity feeds the granules into an outlet opening formed in the centre of the storage mean, leaving a substantial residue forming an inverted cone outward from the opening. Sweep means are used to convey this residue to the opening, originally human, today more often a sweep conveyor, which is generally radially disposed and movable about the opening to sweep the granules towards the opening. Conventionally this conveyor is an auger.

An alternative type of conveyor is a so called bin paddle sweep. This type of conveyor normally includes an elongated frame, a first sprocket at one end of the frame and a second sprocket at the other end of the frame, an endless chain extending between the first and the second sprockets, a plurality of spaced apart paddles attached to the chain, and a motor for causing the chain to rotate whereby the paddles will drag or sweep grain to the well in the floor of the grain bin. Since the conveyors are relatively long there might be a problem with the paddles not travelling in the intended path. Further, these conveyors generally also have a hood with a top panel and side walls. The side wall facing the grain to be conveyed does not reach down to the floor of the bin, whereas the other as far as possible goes all the way down. However, not all of the grain will be conveyed since some will pass the paddles and under the side wall reaching the closest to the floor.

BRIEF SUMMARY

The object of the present invention is to provide an improved grain sweep.

This object is achieved by the grain sweep as set forth in the appended claims.

According to the present invention a grain sweep is provided for use on a floor comprising an elongated frame. Said frame comprises an elongated hood comprising a top panel and first and second side walls, a first and a second wheel rotatably attached to said elongated frame adjacent a first and a second end of said elongated frame, respectively. A drive means is further provided for passing about said first and second wheels and a plurality of spaced apart paddles arranged on said drive means. The hood further comprises one bottom wall extending from one of said side walls and at least one paddle comprising a side with one part adjacent the bottom wall and parallel with the floor and one part with corresponding shape to the bottom wall.

The drive means is typically a chain but could alternatively be some kind of belt or similar. The bottom wall provides for a lower friction control of the paddle path, i.e. instead of the entire edge facing the inner side wall rubbing against the wall, a small piece of the outer part of the paddle adjacent the bottom wall will slide against the edge of the bottom wall. Thus, when the paddle is in the working position, the edge of the paddle closest to the floor will have a stepped profile, one part above the bottom wall and the other part immediately above the floor, i.e. the edge of the at least one paddle part adjacent the bottom wall and parallel with the floor stretches further towards the floor than the other paddle part. Not all paddles need to have an edge with two parts, by only having every second or every third paddle with two parts the friction against the floor will be lower than if all paddles should be the same, i.e. with two parts where one part rubs against the floor. This frequency can be altered according to wishes, i.e. the paddles with two parts in a grain sweep could range from each of the paddles to every tenth paddle.

According to one aspect of the present invention, the bottom wall is parallel with the floor. This means that the paddle edges of the two parts will be parallel to one another.

Alternatively, the bottom wall is at an angle larger than 1° versus the floor. The idea is to have a slope towards the point dividing the paddle edge into the two parts, thereby decreasing build up of grains on the inner side wall.

According to a further aspect of the present invention the edge of the bottom wall has a ridge reaching inwardly the hood. Thus, the paddles will have a correspondingly shaped notch or recess. The travelling path of the paddles will be more controlled and their movement laterally will be limited. As for the ridge, the cross section of the ridge could have an inverted V-shape or a sinus shape. Other shapes are of course possible as long as the ridge is not to high preventing grains from moving from one side of the ridge to the other.

According to another aspect of the present invention, the plane of the one part of the paddles with a corresponding shape to the bottom wall is perpendicular to the direction of the paddles movement. An alternative is to have the paddles angled such that the grains will move towards the other part of the paddle when the paddle is moving forward.

According to yet another aspect of the present invention the plane of the part of the paddle with an edge parallel with the floor is at an angle larger than 1° to the plane of the other part of the paddle. An advantage is that with this solution the grains will more likely be pushed over the ridge on the bottom wall.

For moving the grain sweep laterally there is provided a drive wheel at least at one end of the grain sweep. According to one aspect of the present invention the drive wheel is attached at one end of the frame, the drive wheel comprising a circular plate of material, a plurality of elongate folded plates attached to one side of said circular plate and distributed like spokes on a wheel with one end of each folded elongate plate pointing towards the centre part of the circular plate and the other end pointing towards the periphery of the circular plate. If the grain sweep is placed in a silo or bin, the drive wheel runs along the inside wall of the silo/bin.

According to one aspect of the drive wheel a floor contacting part is attached to each elongate folded plate at the end point towards the periphery of said circular plate and arranged such that the floor contacting parts extend beyond the periphery of the circular plate.

According to another aspect of the drive wheel the floor contacting parts are arranged at an angle relative the plane of the circular plate such that grains are moved towards the grain transporting parts of the grain sweep upon rotation of the drive wheel.

In a preferred embodiment the floor contacting parts are made from a material comprising rubber. This minimizes the noise from the conveyer as compared to another harder material.

A drive mechanism for rotating the drive wheel is necessary. Preferably the drive mechanism comprises a drive shaft, wherein one end of the drive shaft is connected to the drive wheel and the other end is journalled in bearings, the bearings being provided in a housing. The housing protects the bearings from the grain dust and thus extends the working lifetime of the conveyor.

DESCRIPTION OF THE FIGURES

The invention will now be further disclosed with reference to the accompanying drawings.

DETAILED DESCRIPTION

The following description sets forth exemplary methods, parameters and the like. It should be recognized, however, that such description is not intended as a limitation on the scope of the present disclosure but is instead provided as a description of exemplary embodiments.

Figure 1A:
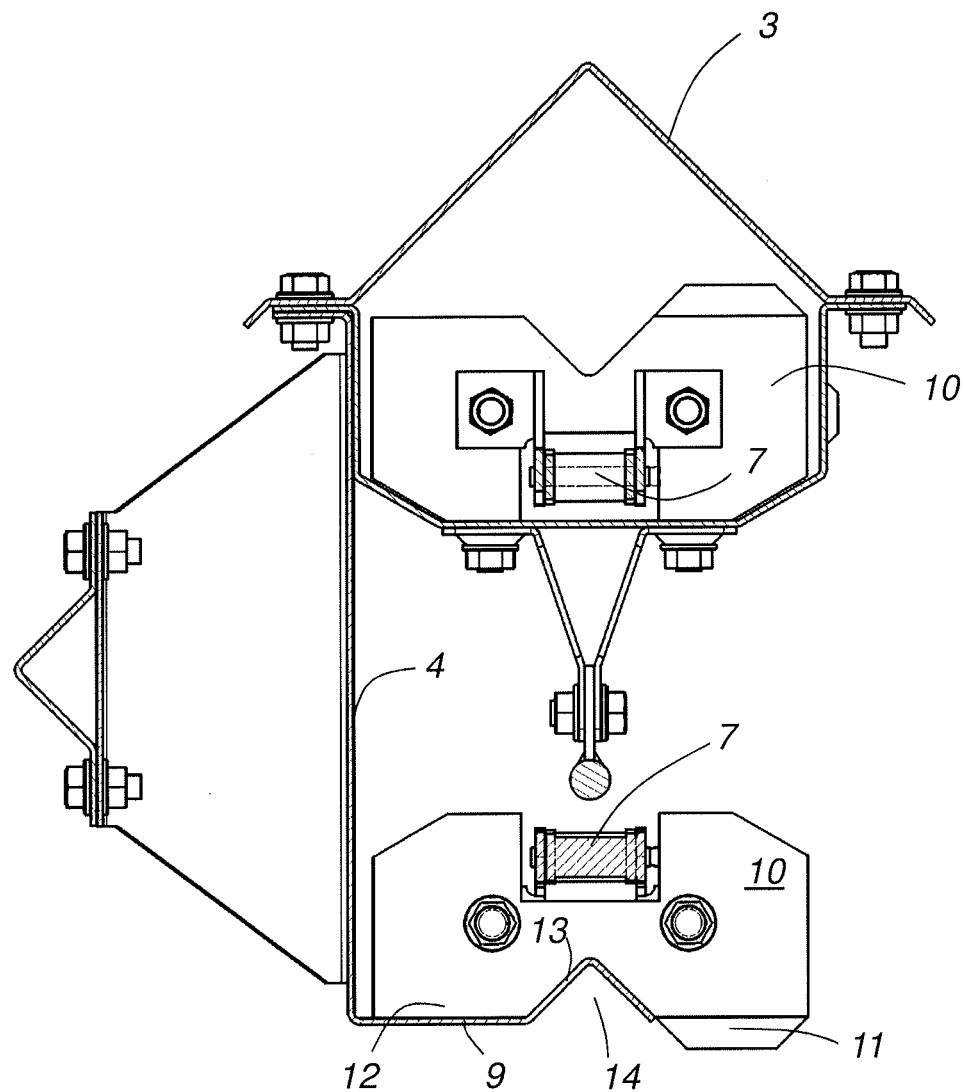
FIGS. 1*a* and 1*b* are cross sections of the grain sweep.
Figure 1B:
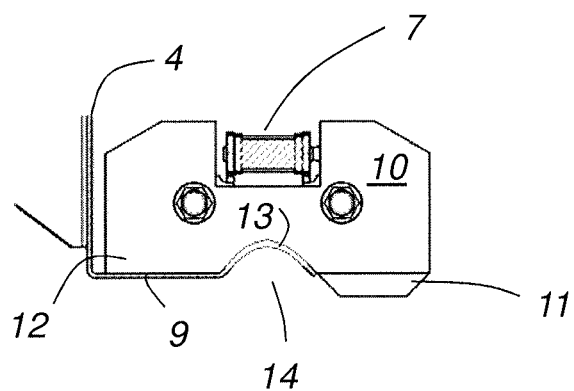

In FIGS. 1 *a*, 2 and 3 can be seen a grain sweep 1 for use on a floor comprising an elongated frame, said frame comprises an elongated hood 2 comprising a top panel 3 and first 4 and second 5 side walls, a first 6 and a second wheel rotatably attached to said elongated frame adjacent a first and a second end of said elongated frame, respectively, a drive means 7 passing about said first 6 and second wheels, and a plurality of spaced apart paddles 8 arranged on said drive means 7.

As also can be seen the hood 2 further comprises one bottom wall 9 extending from one of said side walls 4 and one paddle 10 that comprises a side with one part 11 adjacent the bottom wall 9 and parallel with the floor and one part 12 with corresponding shape to the bottom wall 9.

The edge of the bottom wall 9 has a ridge 13 reaching inwardly the hood 2. The cross section is in the shown embodiment of the ridge 13 an inverted V-shape. Alternatively, the cross section of the ridge could be sinus shaped (shown in FIG. 1*b*). The paddles 8, 10 have a recess 14 corresponding to the ridge 13 on the bottom wall 9 of the hood 2.

In the shown embodiments the plane of the one part 12 of the paddles 8, 10 with a corresponding shape to the bottom wall 9 is perpendicular to the direction of the paddles 8, 10 movement. Further, the edge of the at least one paddle part 11 adjacent the bottom wall and parallel with the floor stretches further towards the floor than the other paddle part 12.

Figure 2:
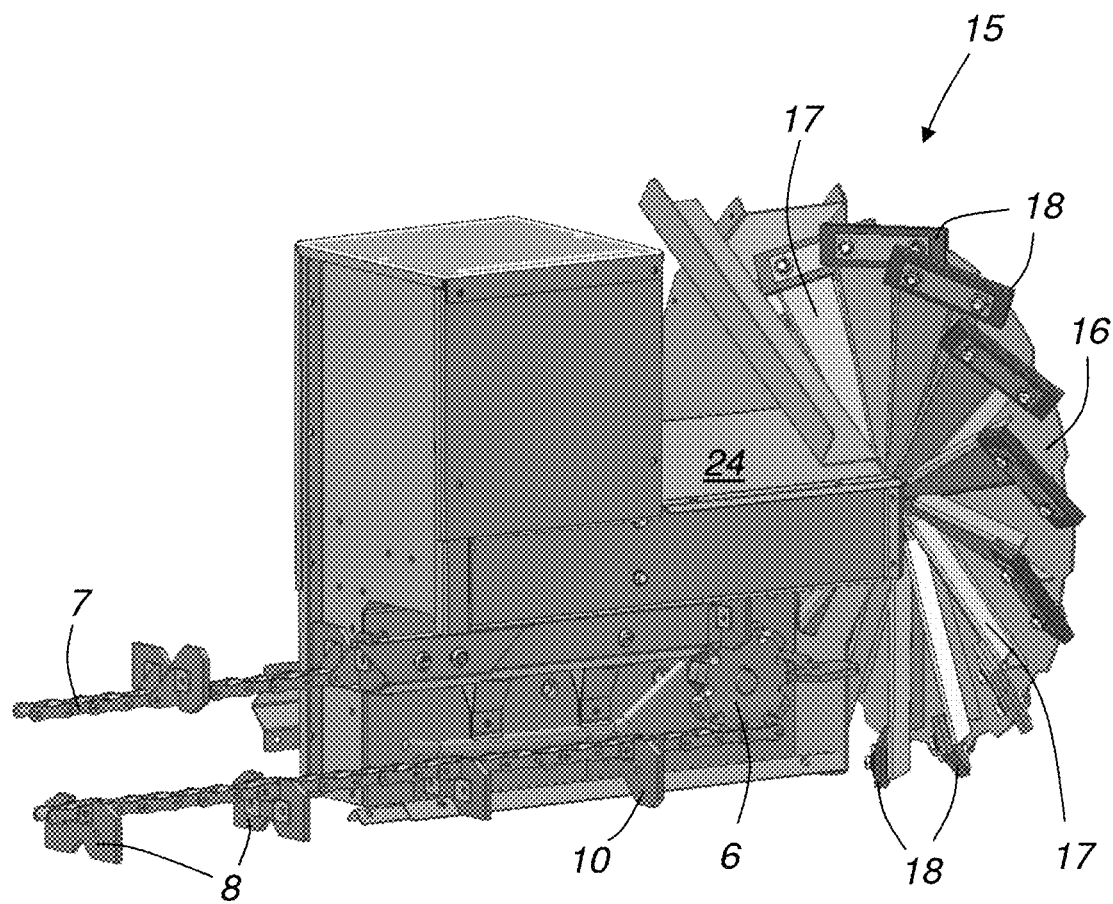
FIG. 2 is a perspective view of a drive wheel and parts of the grain sweep.
Figure 3:
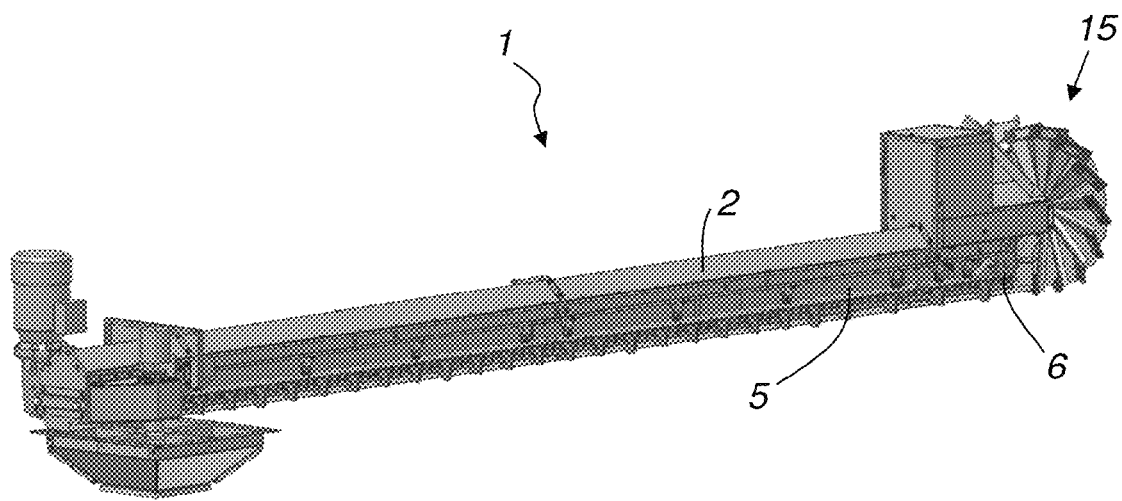
FIG. 3 is a perspective view of a grain sweep.

FIGS. 2 and 3 show the drive wheel 15 for moving a grain sweep 1. In FIG. 2 can be seen that the drive wheel 15 is attached at one end of the frame. The drive wheel 15 comprising a circular plate 16 of material, a plurality of elongate folded plates 17 attached to one side of said circular plate 16 and distributed like spokes on a wheel with one end of each folded elongate plate pointing towards the centre part of the circular plate 16 and the other end pointing towards the periphery of the circular plate 16. The elongate folded plates 17 could for instance be welded to the circular plate 16.

Floor contacting parts 18 are attached to the elongate folded plates 17 at the ends pointing towards the periphery of the circular plate 16. They are further arranged such that the floor contacting parts 18 extend beyond the periphery of the circular plate 16.

The floor contacting parts 18 are further arranged at an angle relative the plane of the circular plate 16 such that grains are moved towards the grain transporting parts of the grain sweep 1 upon rotation of the drive wheel 15. In the shown embodiments the floor contacting parts 18 are made from a material comprising rubber.

Figure 4:
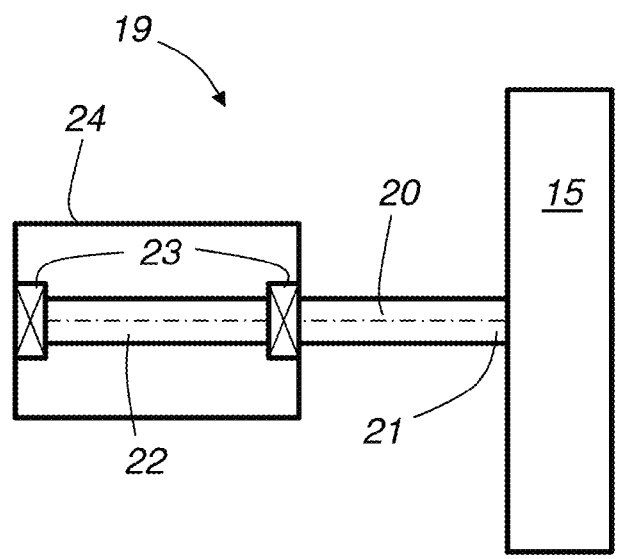
FIG. 4 is a schematic view of the driving mechanism of the grain sweep.

FIG. 4 is a schematic view of a drive mechanism 19 for rotating a drive wheel 15. The drive mechanism 19 comprises a drive shaft 20, wherein one end 21 of the drive shaft 20 is connected to the drive wheel 15 and the other end 22 is journalled in bearings 23, the bearings 23 being provided in a housing 24.

The foregoing is a disclosure of an example practicing the present invention. However, it is apparent that method incorporating modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims. For instance, in FIG. 3, every sixth paddle has a part that will rub against the floor when the grain sweep is in use. However, in some cases it might prove to be better that every seventh or every fifth paddle should be such a paddle.

The invention claimed is:

1. A grain sweep for use on a floor comprising an elongated frame, said frame comprising:
    an elongated hood comprising a top panel and first and second side walls,
    a first and a second wheel rotatably attached to said elongated frame adjacent a first and a second end of said elongated frame, respectively,
    a drive member passing about said first and second wheels, and
    a plurality of spaced apart paddles arranged on said drive member,
    wherein the hood further comprises one bottom wall extending from one of said side walls, and
    at least one of the paddles comprises a bottom side having a first part and a second part, the first part extending beyond the bottom wall so as to be parallel with the floor, and the second part being directly above the bottom wall.

2. A grain sweep according to claim 1, wherein the bottom wall is parallel with the floor.

3. A grain sweep according to claim 1, wherein the bottom wall is at an angle larger than 1° versus the floor.

4. A grain sweep according to claim 1, wherein the edge of the bottom wall has a ridge reaching inwardly toward the hood.

5. A grain sweep according to claim 4, wherein the cross section of the ridge has an inverted V-shape.

6. A grain sweep according to claim 4, wherein the cross section of the ridge is sinus shaped.

7. A grain sweep according to claim 4, wherein the paddles have a recess corresponding to the ridge on the bottom wall of the hood.

8. A grain sweep according to claim 1, wherein a plane of the second part of the at least one of the paddles with a corresponding shape to the bottom wall is perpendicular to the direction of the paddles movement.

9. A grain sweep according to claim 1, wherein a plane of the first part of the paddle with an edge parallel with the floor is at an angle larger than 1° to a plane of the second part of the paddle.

10. A grain sweep according to claim 1, wherein an edge of the first part of the bottom side of the at least one paddle stretches further towards the floor than an edge of the second part of the bottom side of the at least one paddle.

* * * * *